UNITED STATES PATENT OFFICE.

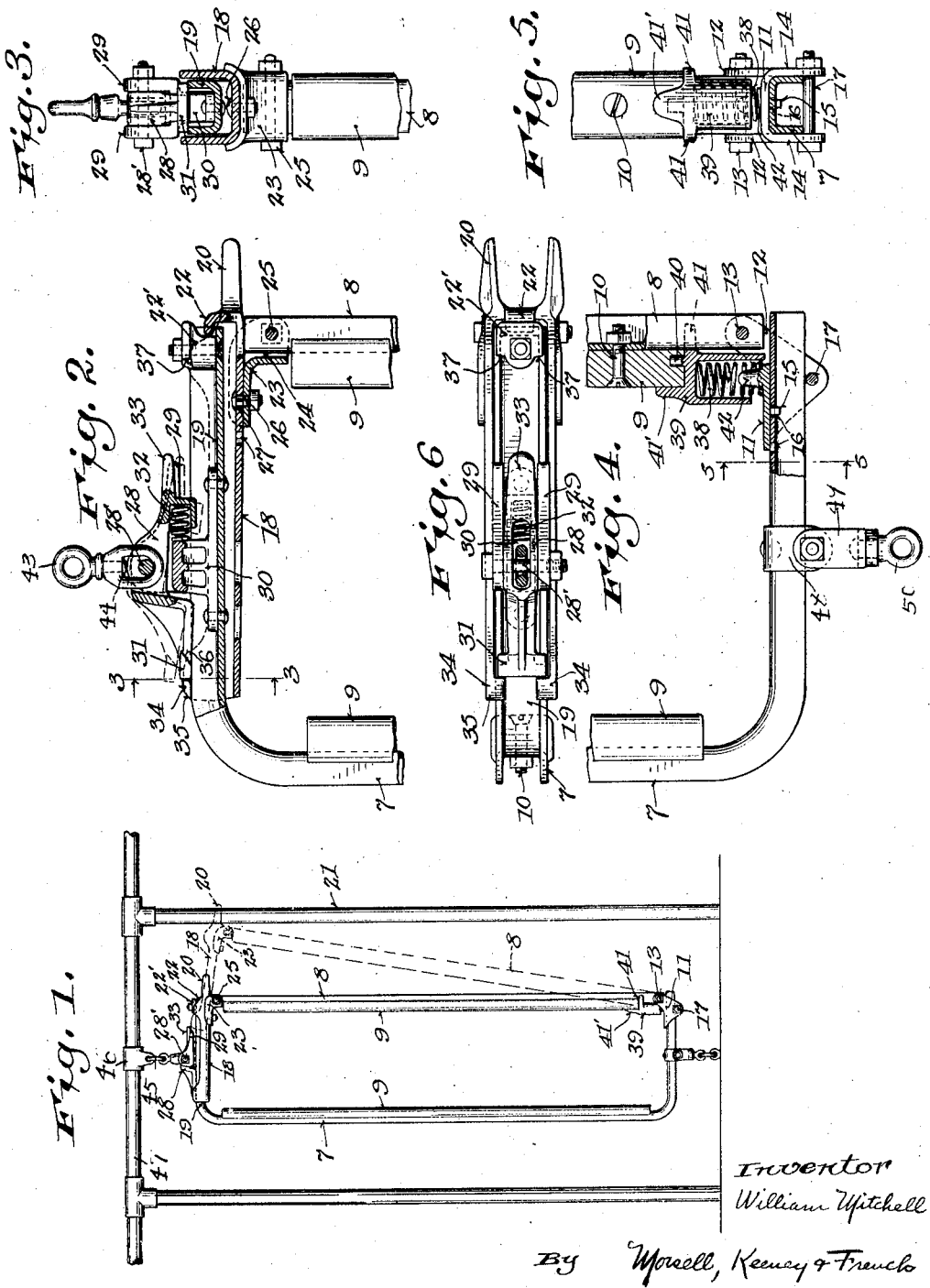

WILLIAM MITCHELL, OF MILWAUKEE, WISCONSIN.

STANCHION.

1,335,178.  Specification of Letters Patent.  Patented Mar. 30, 1920.

Application filed October 11, 1917.  Serial No. 196,058.

*To all whom it may concern:*

Be it known that I, WILLIAM MITCHELL, a citizen of the United States, and resident of Milwaukee, in the county of Milwaukee and State of Wisconsin, have invented new and useful Improvements in Stanchions, of which the following is a description, reference being had to the accompanying drawings, which are a part of this specification.

The invention relates to certain new and useful improvements in stanchions and is fully described and explained in the specification and shown in the accompanying drawing, in which—

Figure 1 is a view of the stanchion showing it hung in the stall;

Fig. 2 is a side view of the upper part of the stanchion, parts being shown in section;

Fig. 3 is a section taken on the line 3—3 of Fig. 2;

Fig. 4 is a side view of the bottom part of the stanchion, parts being shown in section;

Fig. 5 is a section taken on the line 5—5 of Fig. 4;

Fig. 6 is a plan view of the stanchion.

In general the stanchion consists of a U-shaped fixed side bar 7 which is made of channel iron for the sake of strength, workability and cheapness, a movable side bar 8, pivotally secured at its lower end to the fixed bar, means for locking the movable side bar in closed position, means for automatically moving the movable side bar to open position on the release of the locking means, and means for guiding the movable side bar in its movements to open and closed positions.

The movable side bar 8 is also of channel iron and the both side bars are provided with the usual wood lining 9 which is secured to them by screw bolts 10, the nuts of the bolts being seated within the channels to prevent injury to the animal, or to the operator.

The bar 8 is adjustably pivotally secured to the lower portion of the bar 7 by means of a clip 11 having ears 12 to receive the pivot bolt 13 passing through said bar 8, flanges 14 slidably engaging the sides of the bar 7, and a projection 15 adapted to register in any of the holes 16 in bar 7, the clip being secured to the bar 7 by means of a bolt 17 passing through the flanges 14 and bearing against the lower edge of the bar 7. On the withdrawal of the bolt 17 the clip may be moved so as to bring the projection 15 into register with the proper hole 16 to space the movable side bar at the desired distance from the side of the fixed side bar.

The means for guiding the movable side bar 8 in its movements to open and closed position consists of a channel guide member 18 to slidably receive the upper portion 19 of the bar 7. This member is provided with the usual fork 20 to engage the adjacent stall standard 21 when the stanchion is opened and also with an inwardly projecting tongue 22 which engages a stop lug 22′ mounted at the end and within the channel of the portion 19 of the bar 7 to limit the inward movement of the movable side bar 8. The member 18 is adjustably pivotally secured to the bar 8 by means of a clip 23 provided with ears 24 to receive the pivot bolt 25 passing through the upper portion of the bar 8 and secured to the member 18 by a bolt 26 which may be inserted in any one of the apertures 27 in the member 18 to space the upper end of the bar 8 the proper distance from the side of the bar 7 when the stanchion is closed.

The means for locking the movable side bar in closed position comprises a latch 28 pivotally mounted intermediate its ends upon a bolt 28′ between the ears 29 of a fitting 30 secured within the hollow of the portion 19 of the bar 7. The end 31 of the latch 28 is as wide as the channel bar 7 and is normally held down upon the top edges of the channel by means of a spring 32 housed at one end within the latch and bearing against the fitting 30 at the other end. The handle end 33 of the latch is protected from manipulation by the animal by the ears 29 which extend laterally of the handle. The latch 28 is adapted to engage inwardly extending tongues 34 on the member 18 which slidably move along the top of the bar 7 during the greater part of the movement of the member 18 to open position. These tongues 34 have inclined front faces 35 which engage inclined faces 36 on the end 31 of the latch to automatically lift said latch upwardly when the member 18 is moved inwardly on the closing of the side bar 8 and at the end of this movement, the end 31 of the latch moves down behind the tongues 34 and prevents the side bar 8 from being opened until the handle 33 is pressed upon to raise the latch. The outward movement of the side bar 8 is limited by the tongues 34 which engage the abutments 37 on the stop 22' when the side bar moves to its extreme outer position.

By reason of the sliding fit between the member 18 and the bar 7 any twisting movement of the side bar 8 upon its pivot bolt 13 is prevented and the wearing qualities of the stanchion thereby increased. Furthermore the tongues 34 act as guides, as cooperative parts of the lock and as a cooperative part of means for limiting the outward movement of the movable side bar.

The means for automatically moving the movable side bar to open position on the release of the locking means comprises a spring 38 seated within a housing 39 which is secured to the side bar by an integral pin 40 engaging in a recess in the wood lining strip 9 and ears 41 engaging the sides of the lower end of the side bar 8, and tongue 41' engaging the wood lining, the lower end of said spring being mounted upon a projection 42 integral with the clip 11.

The stanchion may be hung in the stall in any suitable manner and in the present instance I have shown an eyebolt 43 having a swivel joint connection with a link 44, pivotally secured to the upper part of the stanchion by the bolt 28', and a link 45 connecting said eyebolt to a coupling member 46 carried by the frame member or top bar 47 of the stall frame and the lower end of the stanchion is secured for limited movement by a clip 48 secured to the lower portion of the bar 7, a clip 49 pivotally secured to the clip 48, an eyebolt 50 having a swivel connection with the clip 49 and suitably secured at its lower end to the stall floor.

With the construction above described when it is desired to open the stanchion the operator presses down upon the handle 33 with one hand thereby disengaging the end 31 of the latch 28 from the tongues 34 on the member 18 and the spring 38 swings the side bar 8 out to open position, as shown in dotted lines in Fig. 1, the movement of the side bar being limited by the tongues 34 striking the abutments 37 on the stop 22'. In closing the stanchion the side bar 8 is moved inwardly by the operator with one hand, the member 18 moving along the upper portion of the bar 7, the tongues 34 raising the latch 28, the end 31 of the latch being automatically moved down behind the tongues when the tongue 22 strikes the lug 22' and the stanchion thus locked closed. With this arrangement the opening and closing of the stanchion may be accomplished by the operator releasing the lock from either side, front or back, of the stanchion, the stanchion being automatically quickly opened to release the animal by the spring 38 which also holds the side bar 8 in open position against the adjacent stall upright to prevent the animal entering its head between the stall upright and the bar 8 when driven into the stall.

What I claim as my invention is:

1. In a stanchion, the combination, with a U-shaped fixed bar, a clip secured to the lower portion thereof and provided with a projection, a movable side bar pivotally secured to said clip, means for locking the side bar closed, a housing secured to the movable side bar adjacent the clip, a spring seated in said housing and engaging said projection to automatically move the side bar to open position on the release of said locking means.

2. In a stanchion, the combination, with a one-piece U-shaped fixed bar, a clip secured to the lower portion thereof and provided with an upwardly extending projection, a stud on the under side of said clip and adapted to selectively engage apertures in the lower portion of said fixed bar to adjustably position the clip thereon, a movable side bar pivotally secured to said clip, means for locking the side bar closed, a housing secured to the movable side bar adjacent the clip, and an extensile spring seated in said housing and engaging said projection to urge the side bar to open position on the release of said locking means.

3. In a stanchion, the combination, with a U-shaped fixed bar, a clip adjustably secured to the lower portion thereof and provided with a projection, a movable side bar pivotally secured to said clip, means for locking the side bar closed, a lining secured to the inner side of the longitudinal portion of said fixed bar and to the inner side of said movable bar, a housing provided with a projection and tongue portion engaging the lower end of the lining carried by the movable bar to secure the housing to the movable side bar adjacent the clip, and a spring seated in said housing and engaging said projection to automatically move the side bar to open position on the release of said locking means.

4. In a stanchion, the combination with a one-piece U-shaped fixed bar, of a movable side bar pivotally secured thereto at its lower end, a clip member pivotally fixed to the upper end of said movable side bar, a channel guide member adjustably secured to said clip whereby the same is pivotally secured to the upper end of the movable side bar, said channel guide member being slidably mounted upon the upper portion of the fixed bar, a latch pivotally carried by the fixed bar for longitudinally engaging said guide member on the movement of the side bar to closed position, and a stop on the fixed bar engaging said member to limit the outer and inner movement of the movable bar.

5. In a stanchion, the combination with a one-piece U-shaped fixed bar, a clip secured to the lower portion thereof, a movable side bar pivotally secured to said clip, means cooperating with said clip and the adjacent end of said movable side bar and normally urging the bar to open position, a clip pivotally secured to the upper end of the movable side bar, a channel guide member fixed to said clip and slidably mounted upon the upper portion of the fixed bar, means carried by the fixed bar for releasably locking said guide member in closed position, and means for adjusting the first named clip on the lower portion of the fixed bar and the channel guide member on the second named clip whereby the movable side bar and the longitudinal portion of said fixed bar may be adjusted with respect to each other.

6. In a stanchion, the combination with a one-piece U-shaped fixed bar, a movable side bar pivotally secured thereto at its lower end, of a clip pivotally secured to the upper end of the movable side bar, a channel guide member fixed to said clip and slidably mounted on the upper portion of the fixed bar, means for releasably locking said guide member in closed position, and means for adjusting the channel guide member on said clip, whereby the movable bar and the longitudinal portion of said fixed bar may be adjusted with respect to each other.

7. In a stanchion, the combination with a one-piece U-shaped fixed bar, of a movable side bar pivotally secured thereto at it lower end, a substantially right-angular clip having one arm thereof pivotally secured to the upper end of the movable side bar and the other arm thereof apertured, a channel guide member provided with apertures in its bottom portion adapted to selectively register with the aperture of said clip, said channel guide member being slidably mounted on the upper portion of the fixed bar, means engageable with the channel guide member for releasably locking the same in closed position, and means detachably engaging the registered apertures of said channel guide member and said clip whereby the movable bar and the longitudinal portion of said fixed bar may be adjusted with respect to each other.

In testimony whereof, I affix my signature.

WILLIAM MITCHELL.